US005694176A

United States Patent [19]
Bruette et al.

[11] Patent Number: 5,694,176
[45] Date of Patent: Dec. 2, 1997

[54] METHOD AND APPARATUS FOR GENERATING TELEVISION PROGRAM GUIDES WITH CATEGORY SELECTION OVERLAY

[75] Inventors: Jeff Bruette, Germantown; Matthew Mohebbi, North Potomac; Ellen Martz, Gaithersburg, all of Md.

[73] Assignee: Hughes Electronics, Los Angeles, Calif.

[21] Appl. No.: 610,096

[22] Filed: Feb. 29, 1996

[51] Int. Cl.$^6$ ................................. H04N 5/445
[52] U.S. Cl. .................. 348/563; 348/569; 348/906
[58] Field of Search .................. 348/6, 7, 12, 13, 348/906, 563, 8, 10, 460, 461, 467, 468, 473, 476, 477, 478, 479, 552, 553, 564, 567, 570, 406; 455/4.1, 4.2, 6.1, 6.2, 6.3; H04N 5/445, 5/50

[56] References Cited

U.S. PATENT DOCUMENTS 4,751,578  6/1988  Reiter et al. .................. 348/906 X
5,253,066 10/1993  Vogel ............................ 348/906 X
5,343,121  8/1994  Young et al. .................... 348/563
5,526,034  6/1996  Hoarty et al. ..................... 348/7

OTHER PUBLICATIONS

VideoGuide User's Manual, VideoGuide, Inc., pp. 9–20, 1995.
James Sorce, Designing a Broadband Residential Entertainment Service: A Case Study, GTE Laboratories Inc. —13th International Symposium Human Factors In Telecommunications, Torino Italy (Sep. 10–14, 1990).

*Primary Examiner*—John K. Peng
*Assistant Examiner*—Nathan J. Flynn
*Attorney, Agent, or Firm*—John T. Whelan; Wanda Denson-Low

[57] ABSTRACT

An apparatus for generating an on-screen television program guide. The apparatus generates a main menu of a program guide, which includes program source information and program event information for a plurality of program sources, and further generates navigation menus for allowing a viewer to modify the program guide. The navigation menus are generated so as to over-write only a portion of the main menu of the program guide.

18 Claims, 4 Drawing Sheets

1

METHOD AND APPARATUS FOR GENERATING TELEVISION PROGRAM GUIDES WITH CATEGORY SELECTION OVERLAY

BACKGROUND OF THE INVENTION

1. Field of the Invention

The present invention relates generally to a subscription television system, and more particularly, to a method and apparatus for generating a user interface for television program guides.

2. Description of the Prior Art

As the subscription television industry has grown, providers of subscription television continually offer more and more channels to the individual subscriber. Typical systems offer more than 100 different channels. Such systems also typically provide a myriad of menus which allow the viewer to customize the program guide in accordance with the viewer's personal preference. For example, viewers may be allowed to customize the guide to display only movies, and then be allowed to further program customize the guide to display only certain types of movies (e.g., westerns, comedies, etc.). Additional menus are also provided to allow the viewer to select to display such things as favorite channel lists and pay-per-view events.

In known systems, for example, the system described in U.S. Pat. No. 5,353,121 (the '121 patent), which is herein incorporated by reference, the various menus provided for customizing the program guide appear as individual or separate menus. In other words, as the viewer toggles between the menus, as each menu is displayed, the display screen is completely rewritten.

FIGS. 2 and 14 of the '121 patent illustrate typical prior art systems. FIG. 2 illustrates the main menu for displaying television programming information. In order to customize the program guide, the viewer selects "channel customization" which causes the system to display the menu illustrated in FIG. 14. In order to display the menu of FIG. 14, which allows the viewer to select a specific type of movie, the display screen is completely rewritten. FIGS. 15–17 illustrate similar "customization menus" which occupy the entire screen.

As a result of rewriting the entire screen when displaying a "customization menu," a substantial problem arises for the viewer in that the viewer easily becomes "lost" within the program guide. More specifically, due to the myriad of possible menus the viewer may access, it is often an extremely difficult task for the viewer to toggle between various menus or to return to a particular menu, such as the main menu. This is due to the fact that once the screen is rewritten, the viewer loses all reference to the other menus and features of the program guide.

Accordingly, there exists a need for a program guide which allows the viewer to easily and readily traverse the multitude of menus without losing reference such that the viewer does not become lost within the program guide.

SUMMARY OF THE INVENTION

The present invention provides a program guide which satisfies the aforementioned needs. Specifically, the present invention provides a program guide which provides navigation menus such that the viewer is provided with a visual reference to the previously selected features or menus of the program guide.

The present invention relates generally to an apparatus for generating an on-screen television program guide. The apparatus comprises means for generating a main menu of a program guide, which includes program source information and program event information for a plurality of program sources, and means for generating navigation menus for allowing a viewer to modify the program guide. The navigation menus are generated so as to overwrite only a portion of the main menu of the program guide.

In a second embodiment of the present invention, the apparatus comprises means for receiving a signal comprising program source information and program event information for a plurality of program sources. The program event information comprises a plurality of classification tags, wherein each of the program events has at least one corresponding classification tag. The apparatus further comprises memory means for storing the program source information and the program event information; user input means comprising predefined buttons, each of which corresponds to one of the plurality of classification tags; and a system controller coupled to the memory means and the user input means. The system controller functions to generate a category specific on-screen television program guide in response to depression of one of the predefined buttons on the user input means. The resulting category specific on-screen television program guide comprises only program events having a classification tag corresponding to the classification tag associated with the selected predefined button.

As described in detail below, the method and apparatus of the present invention provide important advantages over the prior art. Most importantly, the present invention minimizes the possibility of the viewer becoming lost within the guide because during customization of the program guide, a substantial portion of the guide remains visible at all times. Furthermore, the present invention allows the viewer to easily and readily traverse or modify the program guide.

The invention itself, together with further objects and attendant advantages, will best be understood by reference to the following detailed description, taken in conjunction with the accompanying drawings.

DETAILED DESCRIPTION OF THE DRAWINGS

Figure 1:
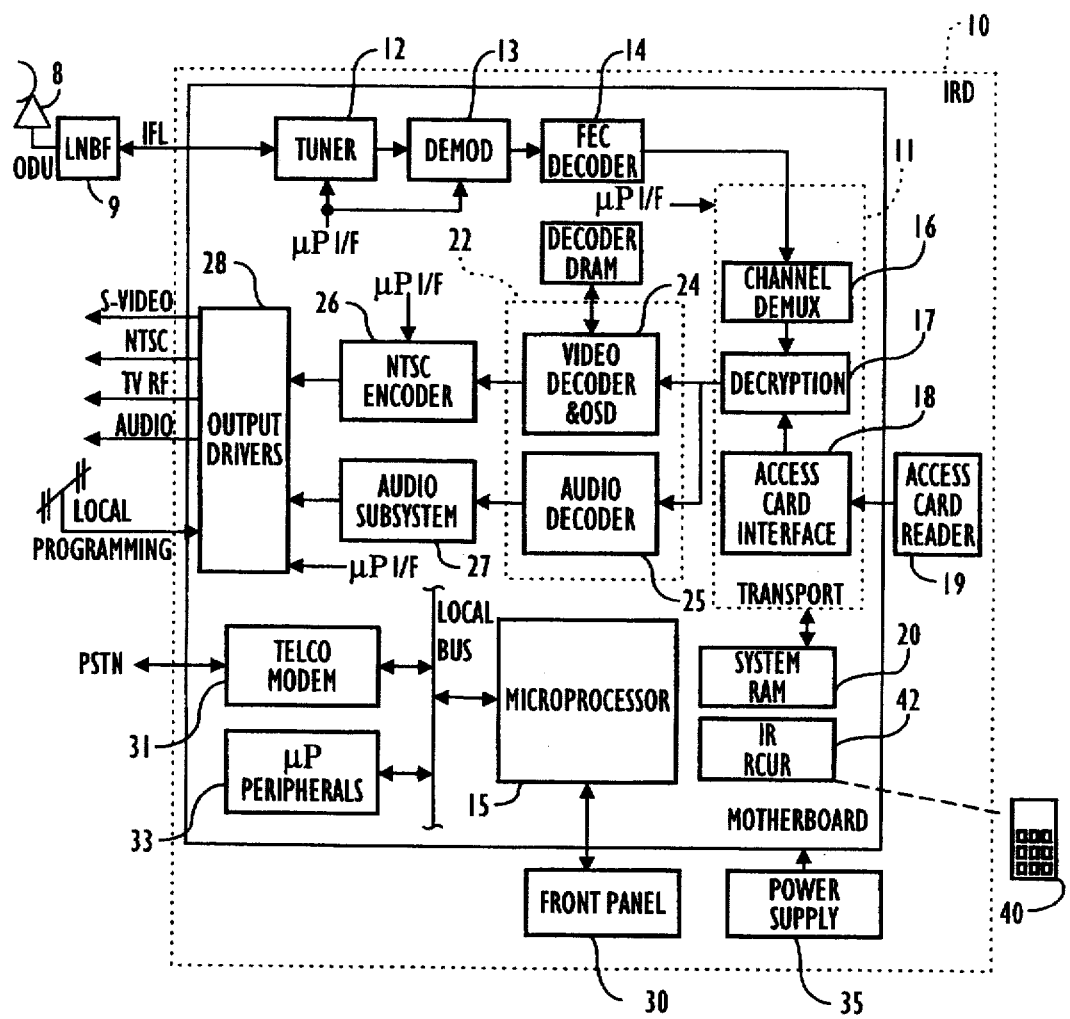
FIG. 1 is a functional block diagram of one embodiment of the terminal device of the present invention.

FIG. 1 is a functional block diagram of one embodiment of the terminal device 10 of the present invention. As shown in FIG. 1, the terminal device 10 includes receiving means 11 comprising tuner 12, demodulator 13 and FEC decoder 14. The receiving means 11 is controlled by microprocessor 15, and operates to receive a signal which includes program guide information, and video and audio information for all channels available on the given system.

In the embodiment of FIG. 1, an antenna 8 and low noise filter 9 function to receive the signal from a satellite source and to couple the signal to the receiving means 11 of the terminal device 10. However, it is noted that the present invention is not limited to system providers which utilize satellite transmissions to broadcast signals. The novel system of the present invention could be readily used with system providers who supply signals via, for example, cable or telephone lines.

Upon receipt of the signal, tuner 12 functions to down-convert the received signal to an intermediate frequency ("IF"). The IF signal is then converted to a digital equivalent by the demodulator 13 and coupled to decoder 14, which provides forward error correction on the received signal.

Apparatus 10 also comprises a transport chip 11. The transport chip 11 preferably comprises a channel demultiplexer 16, a decryption unit 17 and an access card interface 18. The output of the decoder 14 is coupled to the channel demultiplexer 16, which functions to separate the audio and video information of each channel, and also separates the program guide information. Under control of the microprocessor 15, the channel demultiplexer 16 provides at its output port, the audio and video information of a selected channel or the program guide information.

Transport chip 11 further comprises an access card reader 19 which is coupled to the decryption unit 17 and the access card interface 18. The access card reader 19 operates in conjunction with the decryption unit 17 and the access card interface 18 to provide a means of preventing, for example, unauthorized pay-per-view movies from being ordered by children.

Apparatus 10 further comprises a modem 31 which allows the microprocessor 15 to be coupled to, for example, the public telephone network. The apparatus also includes microprocessor peripherals 33, such as serial and/or parallel data ports, and a power supply 35 for supplying power.

In the satellite system illustrated in FIG. 1, multiple transponders located in a satellite (not shown) are utilized to transmit channel information (e.g., audio, video) to the terminal device 10. Each transponder transmits information regarding multiple channels (i.e., multiple program sources, such as ABC, CBS, etc.). However, each tranSponder also transmits the program guide for every channel provided by the system provider on one of the frequencies available within the given transponder.

As such, regardless of which transponder the tuner 12 is tuned to, the program guide is available at the output of the channel demultiplexer 16. Under control of the microprocessor 15, the program guide is stored in random access memory ("RAM") 20, which is coupled to the channel demultiplexer 16. The system RAM 20 also functions to buffer the digital data associated with the audio and video data of a given channel.

The microprocessor 15 operates to periodically update the program guide stored in the system RAM 20. In the present embodiment, the program guide is updated one of two ways. First, the microprocessor 15 periodically analyzes the program guide transmitted by the provider to determine if the program guide has been updated. This can be accomplished, for example, by utilizing a flag bit which indicates that the program guide has been modified. If the program guide has been modified, the microprocessor 15 stores the updated guide in the system RAM 20. Second, as an independent process, the microprocessor 15 monitors an expiration date/ time transmitted along with the program guide. Upon reaching the expiration date/time, the microprocessor 15 updates the program guide stored in system RAM 20 with the program guide currently being transmitted.

Returning to FIG. 1, the terminal device of the present invention further comprises a MPEG chip 22, for example, Part No. 64002, manufactured by LSI Logic. The MPEG chip 22 comprises a video decoder and on screen display generator 24, and an audio decoder 25. The MPEG chip 22 functions to decompress the audio and video data output by the channel demultiplexer 16, which is transmitted by the provider in a compressed format. The NTSC encoder 26 and audio subsystem 27 format the decompressed audio and video data, respectively, for display on, for example, a television receiver. The output drivers 28 function to transmit the audio and video information of a selected channel to the display screen of the television receiver.

In the event the subscriber selects to display the program guide, which can be accomplished by selecting the predefined channel associated with the program guide, via front panel 30 or a remote control (not shown), the microprocessor 15 retrieves the program guide from system RAM 20, and then accesses a font table stored in memory. The microprocessor 15 then converts the program guide stored in memory 20 into a displayable font data. The displayable font data is then coupled to the MPEG chip 22. As described above, the MPEG chip 22 in combination with NTSC encoder 26 and the output drivers 28, functions tow rite the program guide to the television receiver at the start of the next available frame.

Figure 2:
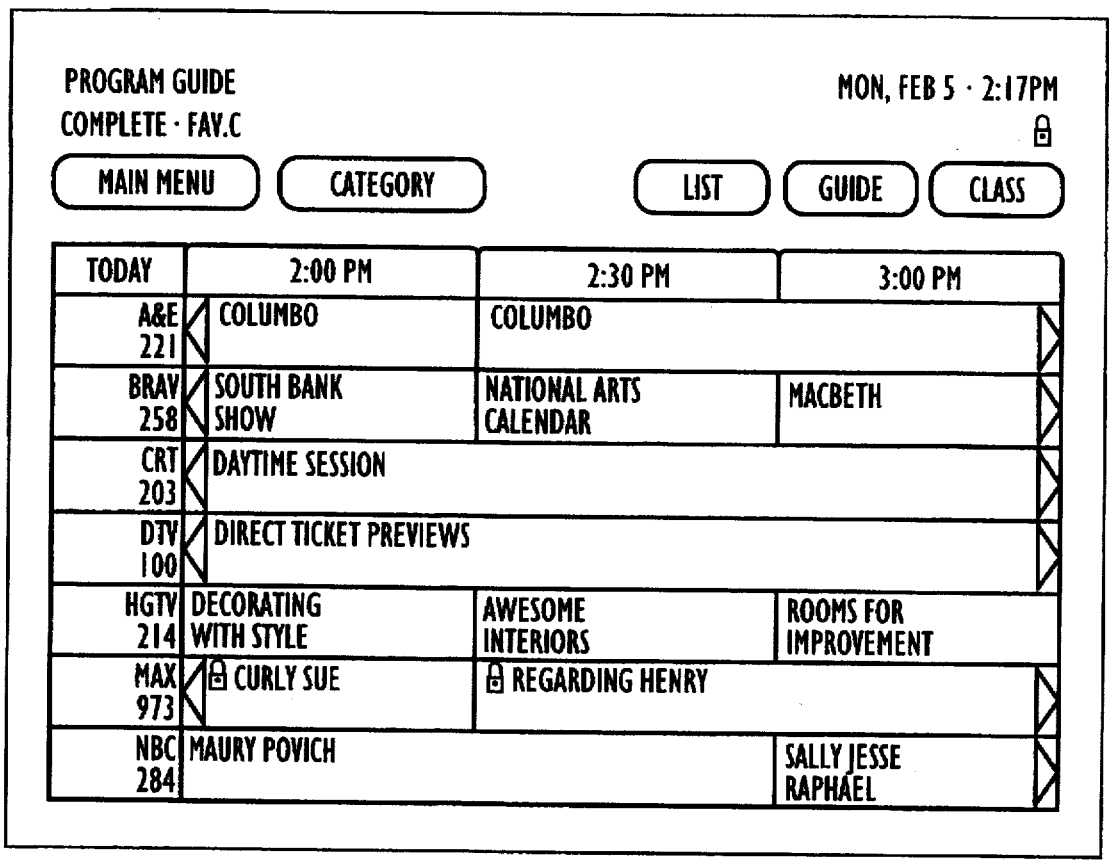
FIG. 2 illustrates an exemplary program guide produced in accordance with the present invention.

FIG. 2 illustrates an exemplary program guide produced in accordance with the present invention. As shown in FIG. 2, each screen of the program guide comprises approximately seven program sources and the corresponding programs. The program source and the programs being shown thereon are displayed on a single line comprising multiple cells of varying length. The first cell in each line indicates the program source and the channel number assigned to the source. In order to view additional program information, the viewer simply presses a designated key, for example, a page down key (i.e., scroll down key) and the foregoing process is repeated for the new program data to be displayed.

Figure 3A:
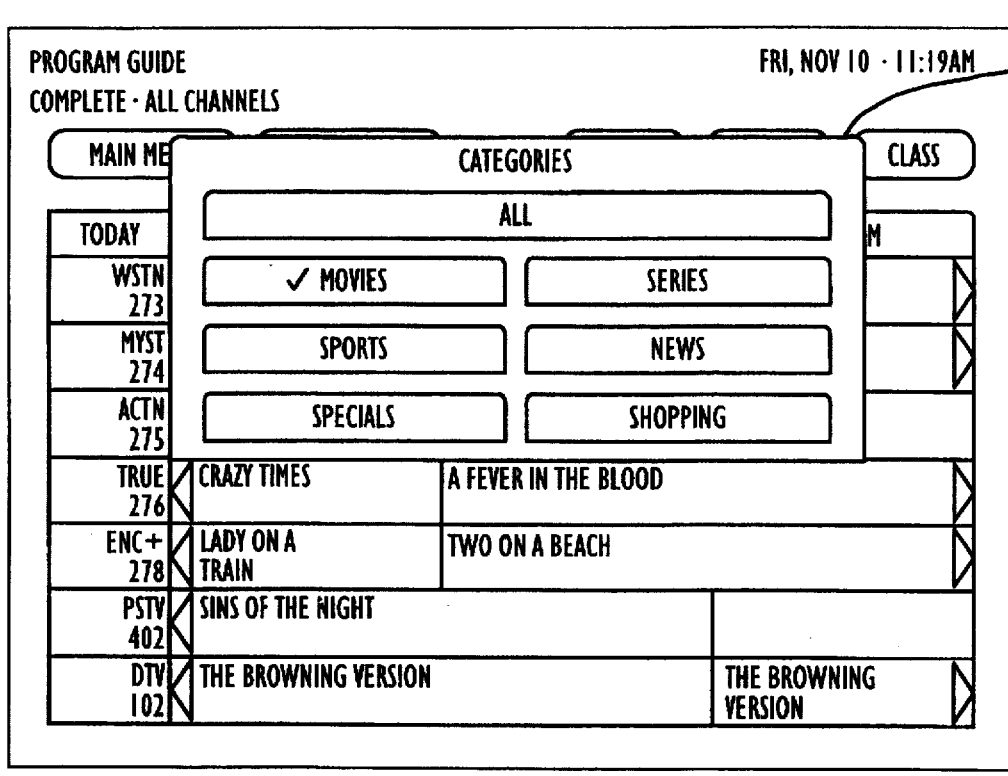
FIGS. 3(a)–3(d) illustrate exemplary navigation menus produced in accordance with the present invention.
Figure 3B:
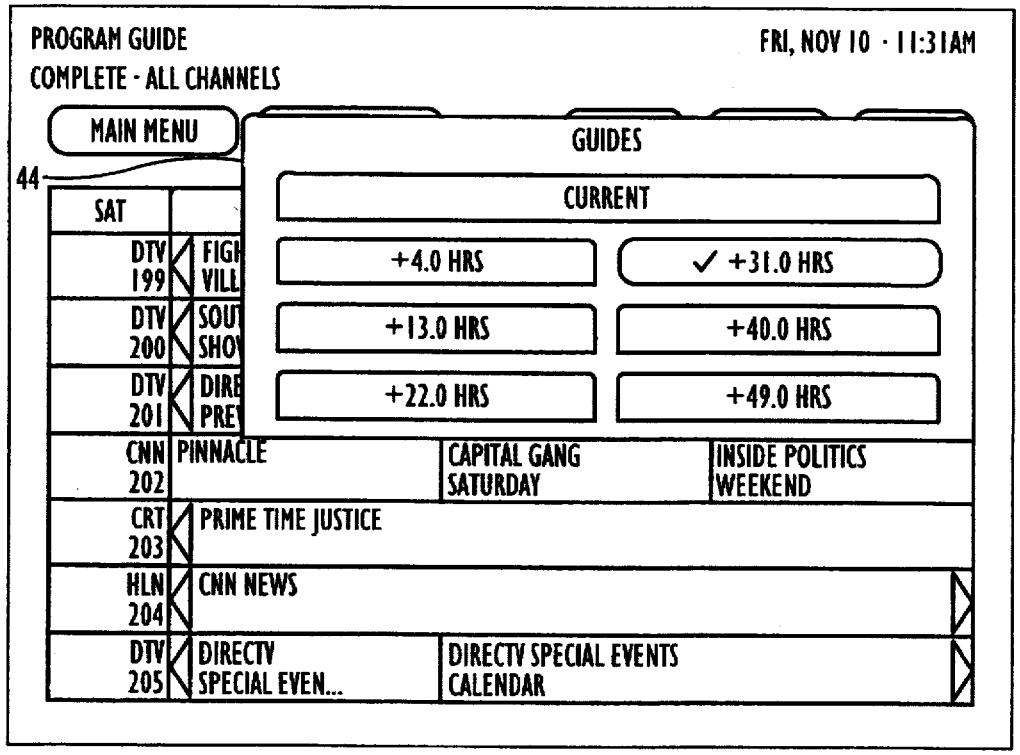
Figure 3C:
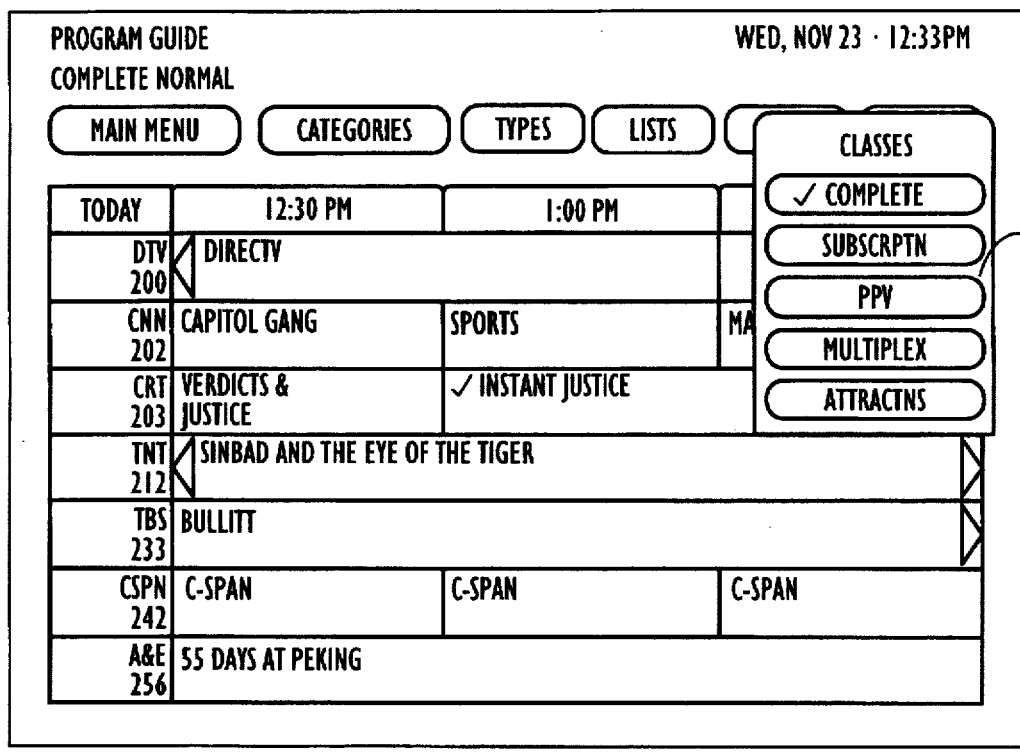
Figure 3D:
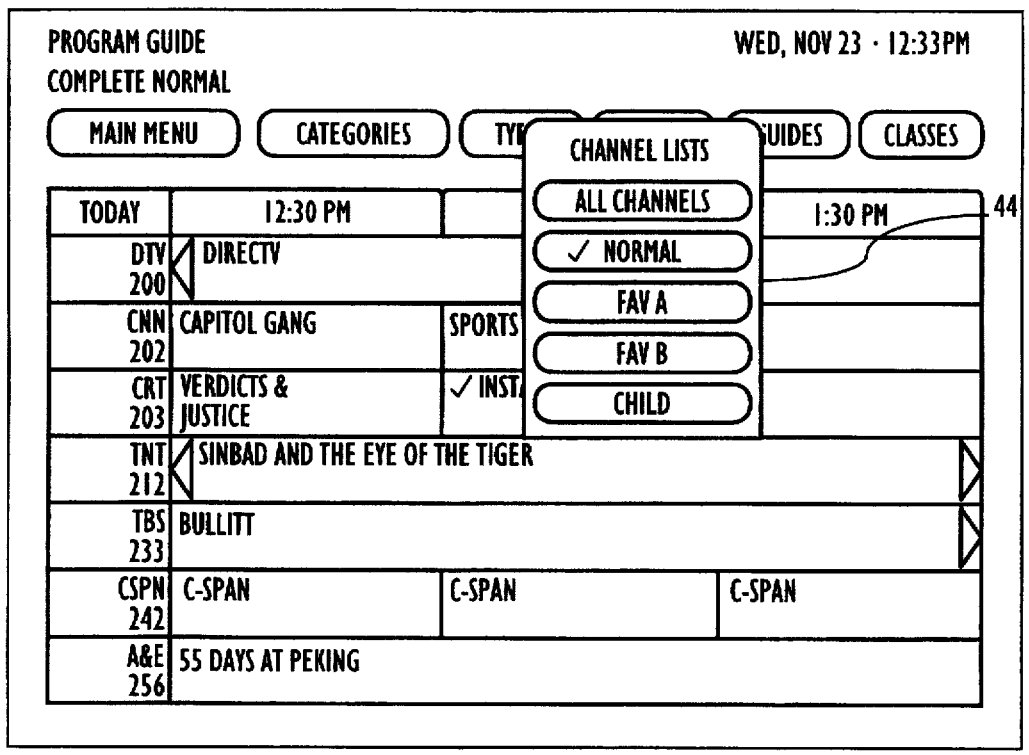

In accordance with the present invention, the apparatus 10 generates navigation menus for "customizing" the program guide. The navigation menus appear as drop-down menus. More specifically, referring to FIGS. 2 and 3(a), when customizing the program guide, the viewer first maneuvers a cursor to highlight the CATEGORIES button found on the main menu of the program guide. The viewer then depresses a designated control key, for example, a SELECT key, which commands the microprocessor 15 to generate and display a list of possible categories. The microprocessor 15 generates the CATEGORIES list such that it appears as a navigation menu 44 suspended from the CATEGORIES button on the main menu. Upon selection of a specific category, the microprocessor 15 proceeds to generate additional navigation menus 44 which allow the viewer to further customize the program guide, as shown for example in FIGS. 3(b)–3 (d).

While various methods of generating the navigation menus 44 are possible, one such method entails commanding the microprocessor 15 to rewrite a portion of the data representing the main program guide, prior to converting the program guide into displayable font data. The rewritten portion of the program guide corresponds to the navigation menu 44 to be displayed. The resulting modified program guide (i.e., the rewritten portion and the unmodified portion) is converted into displayable font data by microprocessor 15, and then forwarded to the MPEG chip 22 so as to be displayed at the start of the next available frame.

Various methods also exist for initially selecting the CATEGORIES button. For example, one method entails maneuvering a cursor on the program guide so as to highlight the button. Once highlighted, the viewer depresses a SELECT key provided on an IR remote 40. (The IR remote 40 includes a switch array which provides means for viewers to issue instructions to the microprocessor 15. The IR remote 40 communicates with the microprocessor 15 via IR receiver 42.)

As stated above, depression of the SELECT key commands the microprocessor 15 to rewrite a portion of the data representing the program guide with data representing the navigation menu 44 so as to generate a modified program guide, and to convert the modified program guide to displayable font data. The modified program guide is then displayed.

Alternatively, the IR remote 40 could be provided with a designated key which corresponds to the CATEGORIES button. Accordingly, upon depression of the designated key, the microprocessor 15 would proceed as detailed above to generate the navigation menu 44 illustrated in FIG. 3(a). Similar to the foregoing embodiment, upon selection of a category, the microprocessor 15 will automatically generate a navigation menu (i.e., TYPE menu) allowing the viewer to further customize the program guide.

Variations of the foregoing embodiment are possible. For example, the remaining "customization" options provided for in the main program guide (e.g., LISTS, GUIDES, CLASSES) can also be provided with a corresponding pre-designated key on the IR remote 40. Upon depression of any of the pre-designated keys, the microprocessor 15 functions to generate the associated navigation menu 44 in the same manner as explained above in conjunction with the CATEGORY key.

In another embodiment of the present invention, the IR remote 40 is provided with pre-defined keys which when depressed function to customize the guide. More specifically, the IR remote 40 can be provided with, for example, a "NEWS" key, a "SPORTS" key and a "MOVIE" key. Upon depression of any one of these keys, the microprocessor 15 functions to retrieve only program guide entries corresponding to the selected category. Thus, if the viewer depresses the "SPORTS" key, the microprocessor 15 will function to generate and display a program guide containing only sports related events.

With regard to the retrieval of related events, upon depression of a pre-defined key on the IR remote 40, the instruction forwarded to the microprocessor 15 comprises a classification tag (e.g., news, sports, movies, etc.), which identifies the events to be retrieved from the complete program guide information stored in RAM 20. The microprocessor 15 then searches the complete program guide and identifies each event having a classification tag matching the classification tag selected by the viewer. (It is noted that program guide information forwarded by the system provider contains a separate classification tag for each event.) Once identified, the relative event information is retrieved and converted to displayable font data and displayed, as described above.

The use of the pre-defined category keys further simplifies the process of customizing the program guide. Indeed, by utilizing the pre-defined category keys the viewer eliminates the need to navigate on-screen menus to customize the program guide. Of course, other pre-defined keys could be included on the IR remote 40 to provide additional customizing options.

The method and apparatus of the present invention provides important advantages over the prior art. Most importantly, the present invention minimizes the possibility of the viewer becoming lost within the guide, because during customization of the program guide, a substantial portion of the guide remains visible at all times. Furthermore, the present invention allows the viewer to easily and readily traverse or modify the program guide.

Of course, it should be understood that a wide range of changes and modifications can be made to the preferred embodiment described above. For example, the navigation menus of the present invention are utilized with various other menus contained within the program guide. It is therefore intended that the foregoing detailed description be regarded as illustrative rather than limiting and that it be understood that it is the following claims, including all equivalents, which are intended to define the scope of the invention.

What is claimed is:

1. A method of generating an on-screen television program guide, said method comprising the steps of:

generating a main menu of a program guide, said main menu comprising program source information and program event information for a plurality of program sources; and generating navigation menus for allowing a viewer to modify the program guide, said navigation menus generated so as to overwrite only a portion of said main menu of said program guide; wherein said navigation menus allow the viewer to select specific categories of programming.

2. The method of generating an on-screen television program guide according to claim 1, wherein at least one of said navigation menus comprises a plurality of categories of programming.

3. The method of generating an on-screen television program guide according to claim 1, wherein a system controller functions to combine said main menu of said program guide with said navigation menus such that said navigation menus over-write only a portion of said main menu of said program guide.

4. An apparatus for generating an on-screen television program guide, said apparatus comprising:

means for generating a main menu of a program guide, said main menu comprising program source information and program event information for a plurality of program sources; and means for generating navigation menus for allowing a viewer to modify the program guide, said navigation menus generated so as to over-write only a portion of said main menu of said program guide;

wherein said navigation menus allow the viewer to select specific categories of programming to be included in the program guide.

5. The apparatus for generating an on-screen television program guide according to claim 4, wherein said means for generating said main menu and said navigation menu comprises a system controller, said system controller operative for combining said main menu of said program guide with said navigation menus such that said navigation menus over-write only a portion of said main menu of said program guide.

6. The apparatus for generating an on-screen television program guide according to claim 4, wherein at least one of said navigation menus comprises a plurality of categories of programming.

7. The apparatus for generating an on-screen television program guide according to claim 4, said apparatus further comprising:

means for receiving a signal, said signal containing program source information and program event information for a plurality of program sources; and memory means coupled to said receiving means, said program source information and program event information for a plurality of program sources being stored in said memory means, said memory means also storing data representing said navigation menus.

8. The apparatus for generating an on-screen television program guide according to claim 4, wherein said system controller is a microprocessor.

9. A method of generating an on-screen television program guide, said method comprising the steps of:

receiving a signal comprising program source information and program event information for a plurality of program sources, said program event information comprising a plurality of classification tags, each of said program events having at least one corresponding classification tag;

storing said program source information and said program event information in memory;

providing a user input means with predefined buttons, each of which corresponds to one of said plurality of classification tags;

generating a main menu of a program guide, said main menu comprising program source information and program event information for a plurality of program sources;

generating a navigation menu for allowing a viewer to select, using said user input means, specific categories of programming to be included in a category-specific program guide, said navigation menu generated so as to over-write only a portion of said main menu; and generating a category specific on-screen television program guide in response to depression of one of said predefined buttons on said user input means, said category specific on-screen television program guide comprising only program events having a classification tag corresponding to the classification tag associated with the selected predefined button.

10. The method of generating an on-screen television program guide according to claim 9, wherein the user input means comprises a remote control.

11. The method of generating an on-screen television program guide according to claim 10, wherein said remote control comprises a separate button for each classification tag included in said program event information.

12. The method of generating an on-screen television program guide according to claim 9, wherein said classification tags identify event categories comprising movies, news and sports.

13. The method of generating an on-screen television program guide according to claim 9, wherein said step of generating a category specific on-screen television program guide in response to depression of one of said predefined buttons on said user input means comprises:

determining the classification tag associated with the pre-defined button depressed on said remote;

searching said program source information and said program event information stored in said memory so as to identify each program event having a classification tag identical to the classification tag associated with the selected pre-defined button; and retrieving and displaying only program events having a classification tag identical to the classification tag associated with the selected pre-defined button.

14. An apparatus for generating an on-screen television program guide, said apparatus comprising:

means for receiving a signal comprising program source information and program event information for a plurality of program sources, said program event information comprising a plurality of classification tags, each of said program events having at least one corresponding classification tag;

memory means for storing said program source information and said program event information;

user input means comprising predefined buttons, each of which corresponds to one of said plurality of classification tags;

means for generating a main menu of a program guide, said main menu comprising program source information and program event information for a plurality of program sources;

means for generating a navigation menu for allowing a viewer to select, using said user input means, specific categories of programming to be included in a category-specific program guide, said navigation menu generated so as to over-write only a portion of said main menu; and a system controller coupled to said memory means and said user input means, said system controller operative for generating a category specific on-screen television program guide in response to depression of one of said predefined buttons on said user input means, said category specific on-screen television program guide comprising only events having a classification tag corresponding to the classification tag associated with the selected predefined button.

15. The apparatus for generating an on-screen television program guide according to claim 14, wherein said user input means comprises a remote control.

16. The apparatus for generating an on-screen television program guide according to claim 15, wherein said remote control comprises a separate button for each classification tag included in said program event information.

17. The apparatus for generating an on-screen television program guide according to claim 14, wherein said classification tags identify event categories comprising movies, news and sports.

18. The apparatus for generating an on-screen television program guide according to claim 14, wherein in response to depression of one of said predefined buttons on said user input means, said system controller determines the classification tag associated with the pre-defined button depressed on said user input means; searches said program source information and said program event information stored in said memory so as to identify each program event having a classification tag identical to the classification tag associated with the selected pre-defined button; and retrieves and displays only program events having a classification tag identical to the classification tag associated with the selected pre-defined button.

* * * * *